United States Patent [19]

Haines

[11] Patent Number: 4,475,566

[45] Date of Patent: Oct. 9, 1984

[54] PRESS TAPS

[75] Inventor: Kenneth R. Haines, East Croydon, England

[73] Assignee: Waddington & Duval Holdings Limited, London, England

[21] Appl. No.: 356,494

[22] Filed: Mar. 9, 1982

[30] Foreign Application Priority Data

| | | | |
|---|---|---|---|
| Mar. 30, 1981 | [GB] | United Kingdom | 8109827 |
| Jun. 1, 1981 | [GB] | United Kingdom | 8116683 |

[51] Int. Cl.³ ........ F16K 13/04; F16K 17/40

[52] U.S. Cl. ........ 137/68 R; 137/318; 222/5; 222/81; 251/320; 251/342; 251/347; 251/348

[58] Field of Search ........ 137/315, 317, 318, 67, 137/68 R; 222/5, 80, 81; 251/319, 320, 342, 347, 348

[56] References Cited

U.S. PATENT DOCUMENTS

| | | | |
|---|---|---|---|
| 549,678 | 11/1895 | Miller | 251/342 |
| 2,515,260 | 7/1950 | Pichler | 137/318 |
| 2,667,760 | 2/1954 | Curtis | 137/68 R |
| 2,778,434 | 1/1957 | Hastert et al. | 222/5 |
| 3,101,188 | 8/1963 | Newmiller et al. | 137/68 R |
| 3,595,445 | 7/1971 | Buford et al. | 222/213 |
| 3,983,897 | 10/1976 | Gebelius | 137/67 |
| 4,080,965 | 3/1978 | Phillips | 137/68 R |
| 4,370,997 | 2/1983 | Braithwaite et al. | 137/318 |

FOREIGN PATENT DOCUMENTS

| | | | |
|---|---|---|---|
| 318688 | 10/1902 | France | 137/318 |
| 55223 | 10/1951 | France | 137/68 R |
| 2255531 | 7/1975 | France | 251/342 |
| 248592 | 3/1947 | Switzerland | 137/68 R |

*Primary Examiner*—George L. Walton
*Attorney, Agent, or Firm*—Wood, Herron & Evans

[57] ABSTRACT

A tap operated by a push button which acts to open a valve member which is biassed to the closed position, the valve member being for normal operation of the tap; also operated by the push button is a seal piercing means which pierces a diaphragm in or adjacent the tap inlet and which after initial operation of the push button remains lodged in the pierced diaphragm, the piercing means only being moved by the push button on the initial operation. The arrangement ensures an added protection against oxygen penetrating into a container fitted with the tap and is particularly useful for wine containers where the added protection ensures a longer shelf life.

8 Claims, 5 Drawing Figures

PRESS TAPS

The present invention relates to taps of the kind that pierce or rupture a container or container seal. Such taps are used to enable initial entry to containers particularly where the containers carry liquids such as table wine which deteriorate in storage due to the access of oxygen.

Known taps for piercing containers normally have a sharp hollow perforated spigot on the tap which is driven into the container to pierce the container or container seal. These taps derive from the very well known cask tap. Such a piercing action requires a positive action separate from any action relating to the operation of the tap itself and usually requires a robust tap construction such that the tap itself is not damaged during the piercing action.

According to the present invention, there is provided a tap having a casing with an inlet and an outlet, a valve in the outlet comprising a seating and valve member, the valve member being sprung to seat on the seating and being operable by a push button, and piercing means operable by the push button to pierce a sealing diaphragm in or adjacent the inlet. The sealing diaphragm may be attached to the tap casing over the tap inlet or attached to the container over the gland on the container into which the tap fits.

The tap according to the invention has the advantage that on first dispersing from the tap, the container is pierced by the action of pressing on the push button. This is a simple operation and the construction of the tap is such that the tap is simple and economic to manufacture.

The piercing means can be formed as a simple one part member comprising a piercing head having a piercing edge at its outer extremity, one or more fins to keep the pierced diaphragm open and a resilient actuating portion which when pressed at an angle, preferably 90° C., to the axis of the head causes the head to move away from the push button into the diaphragm to be pierced. The actuating portion preferably comprises a fork which is biassed towards the push button and which engages over the valve member. This arrangement provides a very positive once and for all action for the tap, that is the piercing head is only moved in the first operation of the push button. It also ensures that in subsequent valve operation all the press effort on the push button is directed only to valve operation and no hang ups can occur due to the piercing means.

A simpler embodiment of the invention has the valve member movable to open and close the outlet in a direction coaxial or otherwise parallel to the piercing means. Preferably the push button, valve member and piercing means are all coaxially movable and the diaphragm is attached to the tap casing over the tap inlet. Such an arrangement is very simple to manufacture.

Figure 1:
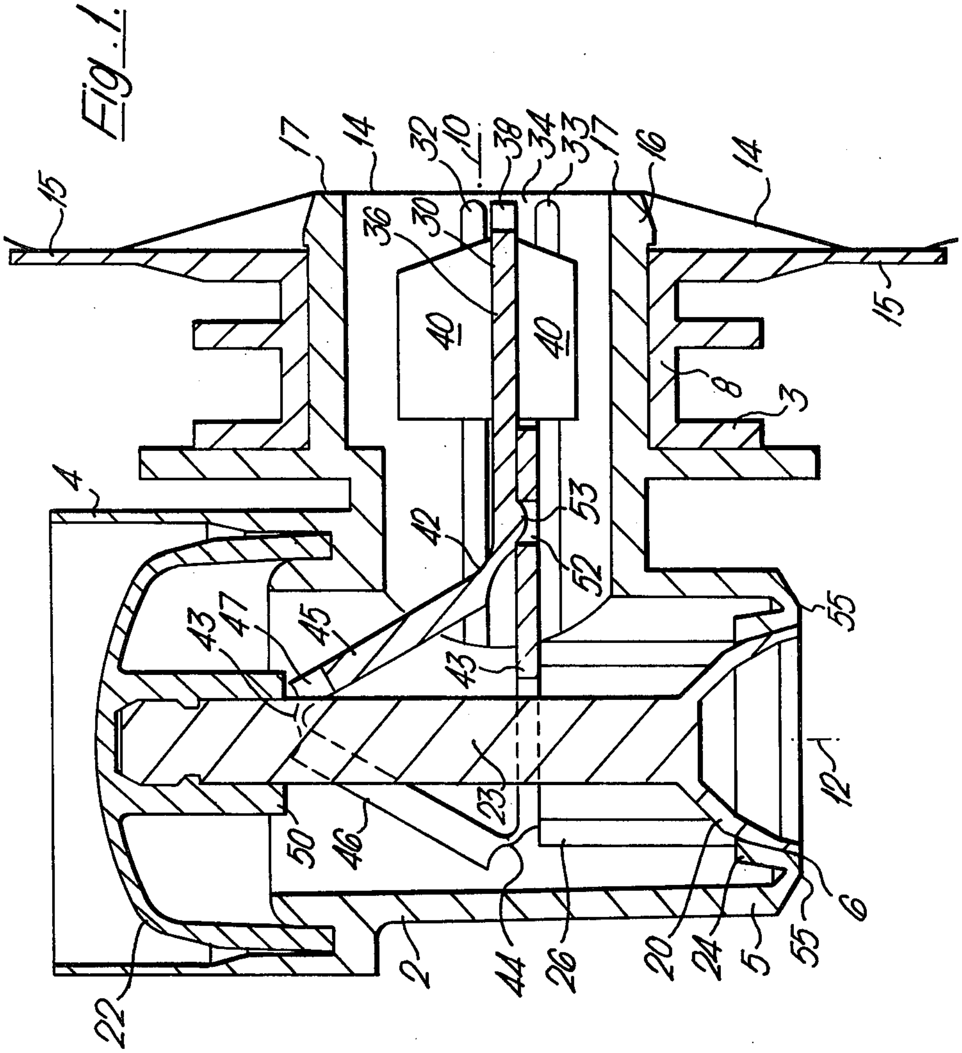
Figure 2:
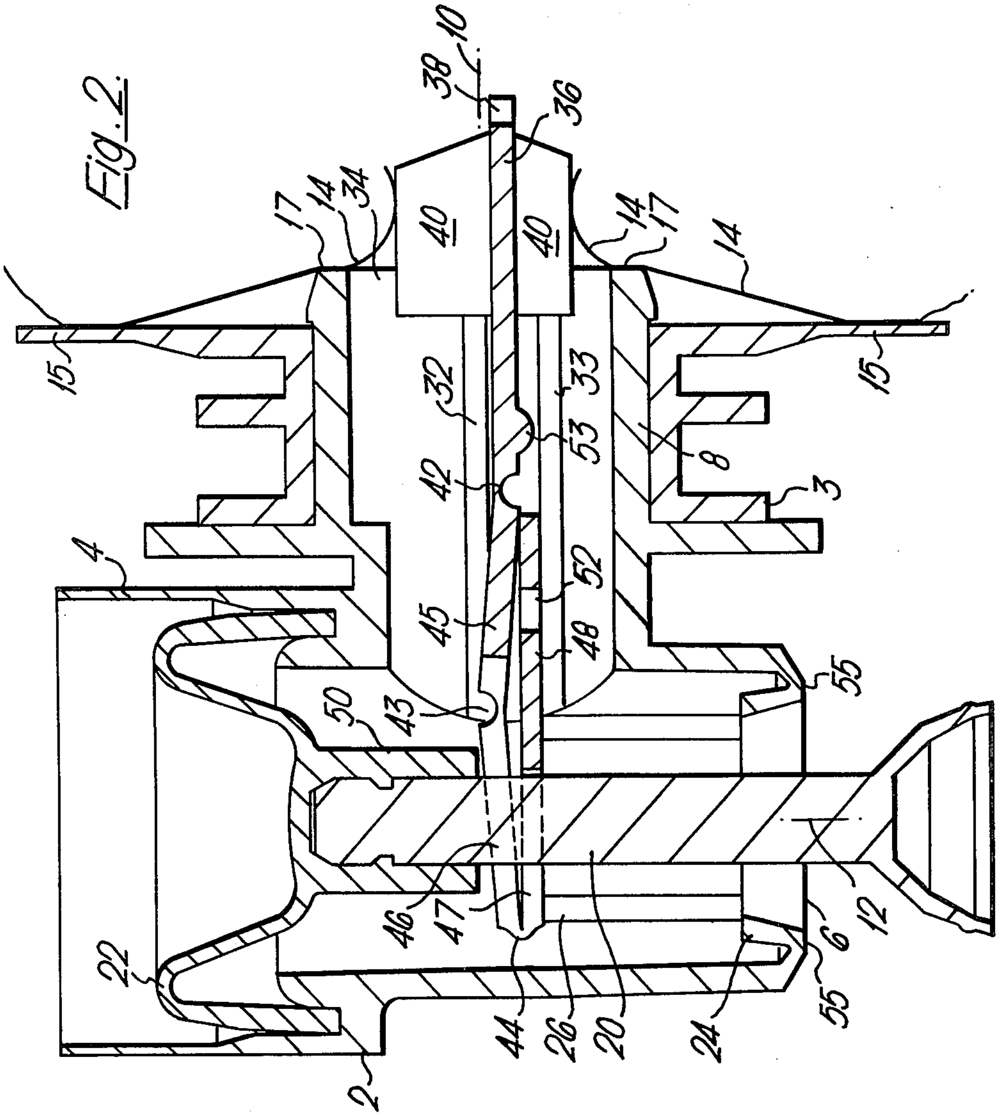
Figure 3:
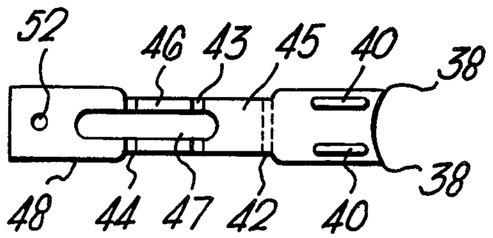
Figure 4:
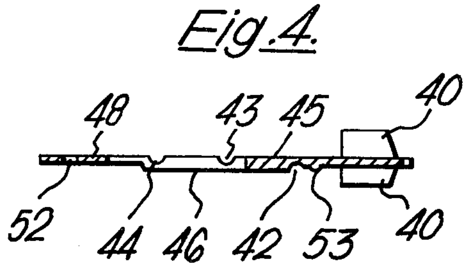
Figure 5:
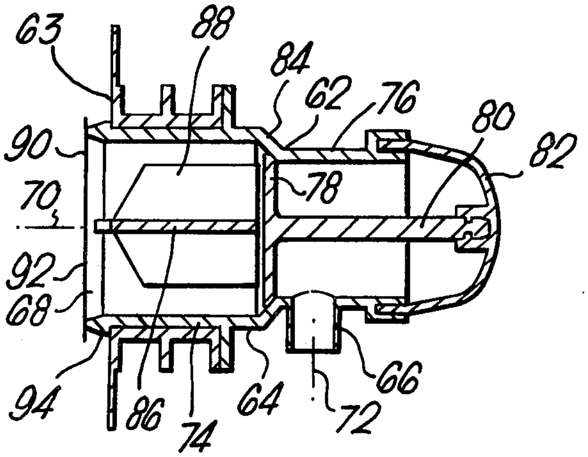

An embodiment of the invention will now be described by way of example with reference to the accompanying drawings in which:

FIG. 1 is a cross section of a tap according to a first embodiment of the invention fitted in a container gland and with the tap in the closed position and the container unpierced, FIG. 2 is a similar cross section to FIG. 1 showing the tap of FIG. 1 operated to open the tap and to pierce the container, FIG. 3 is a plan view of a piercing means or piercing strap for the tap of FIG. 1 prior to assembly in the tap, FIG. 4 is a cross section of the piercing means or strap of FIG. 3, and FIG. 5 is a cross section of a tap according to a second embodiment of the invention.

In FIGS. 1 and 2 can be seen the assembled tap 2 fitted into a gland 3. The tap comprises a body 4 having a cylindrical valve casing portion 5 in which is a tap outlet 6 and cylindrical inlet portion 8. The axis 10 of the inlet portion is at right angles to the axis 12 of the inlet portion 8. The inlet portion 8 fits into the gland 3 in turn fitted into a container (not shown) and a sealing diaphragm 14 of suitable plastics film is heat welded onto gland flange 15 and across the outer extremity 16 of the inlet portion. Alternatively the diaphragm may only extend across the outer extremity 16 and be welded to the annular surface 17 of the outer extremity 16.

The tap has a valve member 20 which is sprung by means of a resilient push button 22 onto a seating 24. The seating 24 is an annular portion from which extends a cylindrical extension or thrust block 26.

Mounted within the inlet portion 8 so as to be slidable in the direction of axis 10 is a piercing means or member 30. Member 30 is guided between guide ribs 32 and 33 extending from either side of the cylindrical inner surface 34 of the inlet portion. The piercing member 30 has a head 36 at the outer extremity of which are two piercing points or edges 38 (see FIG. 3). The head also has four fins 40 which act to keep the diaphragm open once pierced.

Extending from the head is flat part which is hinged at 42, 43 and 44 to form a triangular shaped resilient actuating portion. Hinge 43 forming an apex of the triangle is arranged to be acted on by an inner body portion 50 of push button 22. Flat sections 45, 46 and 48 of the piercing member form sides to the triangle between hinges 42, 43 and 44 respectively. A slot 47 extends between sections 48, 46 and 45 so that when the piercing member is fitted into the body 4 it fits across and engages with valve member 20. The section 48 rests on thrust block 26. Section 48 has a hole 52 which engages with a protrusion or peg 53 on the head and acts to hold the head in the unoperational position shown in FIG. 1 to prevent the head piercing the diaphragm before first operation of the push button.

To operate the tap initially push button 22 is pushed to the position shown in FIG. 2. This causes body 50 to act on hinge 43 and section 46 to flatten the triangular actuating portion and force the head 36 away from the valve member 20 along axis 10 into the diaphragm 14. At the same time peg 53 jumps out of hole 52. The piercing points 38 rupture the diaphragm and the fins 40 lodge in the ruptured hole in the diaphragm to hold this hole open. Thus liquid in the container is enabled to flow to the interior of inlet portion 8 and into body 4 where it can flow through the now open outlet 6.

On releasing the push button the valve member is sprung back by the reformation of the push button and the valve outlet closes. The piercing member normally remains lodged with its head in the ruptured hole of the diaphragm.

The piercing member is formed of polypropylene and the tap body is conveniently formed of the same material.

It will be appreciated that the peg 53 and the hole 52 act to stop the piercing member from premature rupturing of the diaphragm and the initial operation of the push button requires a rather greater effort than in normal use.

Conventionally the tap is disposed behind a tear-out section of a cardboard box enclosing the container. The tap has to be extracted and fitted into place in a slot in the cardboard box before use. The extra thrust required for initial use of the tap is a safeguard against piercing the diaphragm during this fitting process.

In FIG. 5 a second embodiment is shown in which a tap 62 is fitted into a gland 63. The tap has a cylindrical body 64 with an outlet 66 and inlet 68. The inlet has an axis 70 at right angles to the axis 72 of the outlet. The inlet 68 is surrounded by a cylindrical portion 74 which fits into the gland 63. Within the interior of the body 64 is a valve member 78 having a valve stem 80 which is fixed to a press button 82. The valve member seats on a seating 84.

Within the inlet portion 74 is a piercing member 86 with fins 88 and piercing points 90 similar in formation and function to those shown at 40 and 38 in the first embodiment shown in FIGS. 1 to 4.

A plastics diaphragm 92 is welded across the outer extremity 94 of the inlet portion 74 and across the inlet 68.

In initial operation the operator pushes the press button 82 to pierce the diaphragm, the piercing member 86 pierces the diaphragm and remains lodged in the diaphragm. The fins 88 enable liquid to reach the valve member 78 which then is operated to open or shut the outlet as required.

I claim:

1. A tap attachable to a fluid container, fluid in said container being initially retained within said container by a rupturable diaphragm interposed between said container and said tap when said tap is attached to said container, said tap comprising a valve casing that includes a duct opening at one end at a fluid outlet and at the other end at a fluid inlet, said rupturable diaphragm being interposed between said fluid inlet and said container when said tap is attached to said container, a valve for normal open and close operation of said tap, said valve comprising a seat, and a valve member seating on said seat, said valve controlling fluid flow out said outlet during normal operation of said tap, a push button connected to said valve for manually opening said valve, said valve being normally biased closed until and unless said push button is pressed against said closure bias, a diaphragm piercer slidably positioned in said duct, said diaphragm piercer being movable, when said tap is attached to said container, from an initial storage position where fluid flow through said tap is prevented by said diaphragm to a normal operating position where fluid flow through said tap is permitted as controlled solely by said valve, said diaphragm being ruptured by said piercer as said piercer moves from said storage position to said normal operating position, said piercer thereby being positioned in rupturable relation with said diaphragm in said normal operating position, and a first abutment associated with said piercer and a second abutment associated with said push button, initial operation of said push button to open said tap causing contact between said first and second abutments to move said piercer from said initial storage position to said normal operating position, said piercer thereafter remaining in said normal operating position during subsequent operation of said push button so that said piercer moves only on initial pressing of said push button against said normal valve bias and does not move upon subsequent open and close operation of said valve by subsequent pressing of said push button.

2. A tap as set forth in claim 1, said diaphragm piercer comprising at least one piercing protrusion for piercing said diaphragm, and at least one fin to keep said diaphragm open after said diaphragm has been pierced.

3. A tap as set forth in claim 2, said valve comprising a valve stem fixed to said valve member, and said first abutment comprising a first portion operably connected to said diaphragm piercer, a second portion hinged at a first hinge to said first portion and extending toward said push button, a third portion hinged at a second hinge to said second portion, said third portion extending away from said push button, a fourth portion hinged at a third hinge to said third portion, said fourth portion extending towards said inlet and parallel to and lying against said first portion, a slot transverse to said second hinge and extending through said second, third and fourth portions, said valve stem extending through said slot to connect said push button and said valve member, and a guide provided interiorly of said casing to guide said first portion and, therefor, said diaphragm piercer toward said inlet on initial operation of said push button.

4. A tap as set forth in claim 3, said push button being operable to move said valve member along an axis positioned at about 90° to the movement axis of said diaphragm piercer.

5. A tap as set forth in claim 3, said tap comprising a retainer partially carried by each of said first and fourth portions for holding said first and fourth portions in temporary engagement before initial operation of said push button, said retainer comprising a projection on one of said first and fourth portions and a projection receiving recess on the other of said fourth and first portions.

6. A tap as set forth in claim 3, said tap comprising a thrust member provided between said push button and said valve seat, said thrust member providing a surface against which a portion of said fourth portion is supported during initial operation of said push button.

7. A tap as set forth in claim 2, said diaphragm piercer being movable along an axis substantially coaxial wih the movement axis of said valve member.

8. A tap as set forth in claim 7, said valve member acts against said seal opening means.

* * * * *

UNITED STATES PATENT AND TRADEMARK OFFICE
CERTIFICATE OF CORRECTION

PATENT NO. : 4,475,566

DATED : October 9, 1984

INVENTOR(S) : Kenneth Reginald Haines

It is certified that error appears in the above-identified patent and that said Letters Patent is hereby corrected as shown below:

Column 4, line 61
"wih" should be -- with --

Signed and Sealed this

*Second* Day of *July 1985*

[SEAL]

*Attest:*

DONALD J. QUIGG

*Attesting Officer* *Acting Commissioner of Patents and Trademarks*